B. W. KING.
SCALE.
APPLICATION FILED MAY 31, 1910.

1,047,952.

Patented Dec. 24, 1912.

3 SHEETS—SHEET 1.

Witnesses
Albert A. Hofmann.
E. M. Brown.

Inventor
Bert W. King.
By Edward N. Pagelsen,
Attorney

B. W. KING.
SCALE.
APPLICATION FILED MAY 31, 1910.

1,047,952.

Patented Dec. 24, 1912.
3 SHEETS—SHEET 2.

Witnesses
Albert A. Hofmann
E. M. Brown

Inventor
Bert W. King.
By Edward N. Pagelsen
Attorney

B. W. KING.
SCALE.
APPLICATION FILED MAY 31, 1910.

1,047,952.

Patented Dec. 24, 1912.

3 SHEETS—SHEET 3.

Witnesses
Albert A. Hofmann
E. M. Brown

Inventor
Bert W. King.
By Edward N. Pagelsen,
Attorney

UNITED STATES PATENT OFFICE.

BERT W. KING, OF DETROIT, MICHIGAN, ASSIGNOR TO STANDARD COMPUTING SCALE COMPANY, LIMITED, OF DETROIT, MICHIGAN, A LIMITED PARTNERSHIP.

SCALE.

1,047,952.

Specification of Letters Patent.   Patented Dec. 24, 1912.

Application filed May 31, 1910.   Serial No. 564,080.

*To all whom it may concern:*

Be it known that I, BERT W. KING, a citizen of the United States, and a resident of Detroit, in the county of Wayne and State of Michigan, have invented a new and useful Scale, of which the following is a specification.

This invention relates to computing spring-scales equipped with cylindrical charts, and the object of my improvements is to provide a spring-scale of good capacity which shall be simple in construction, efficient in operation, and compact.

Figure 1:
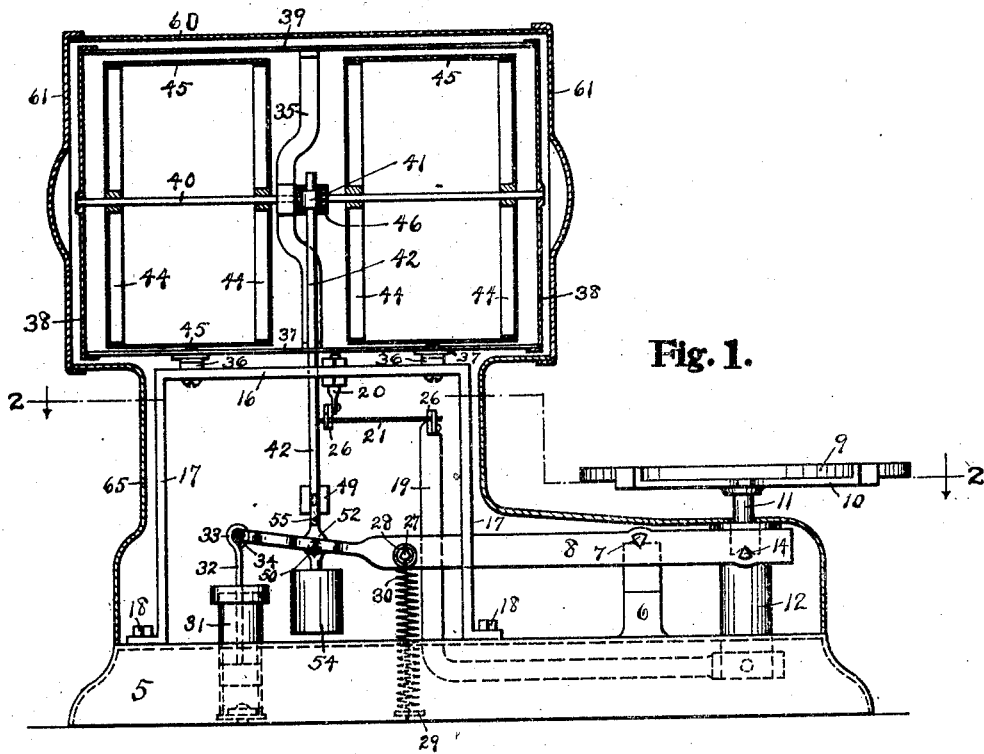
Figure 2:
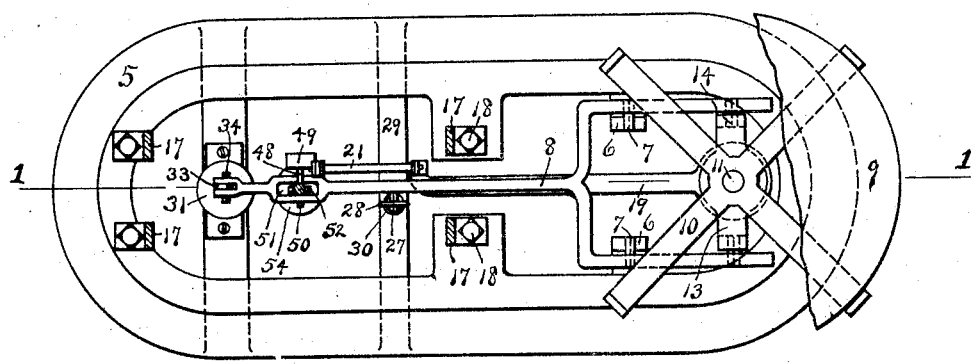
Figure 3:
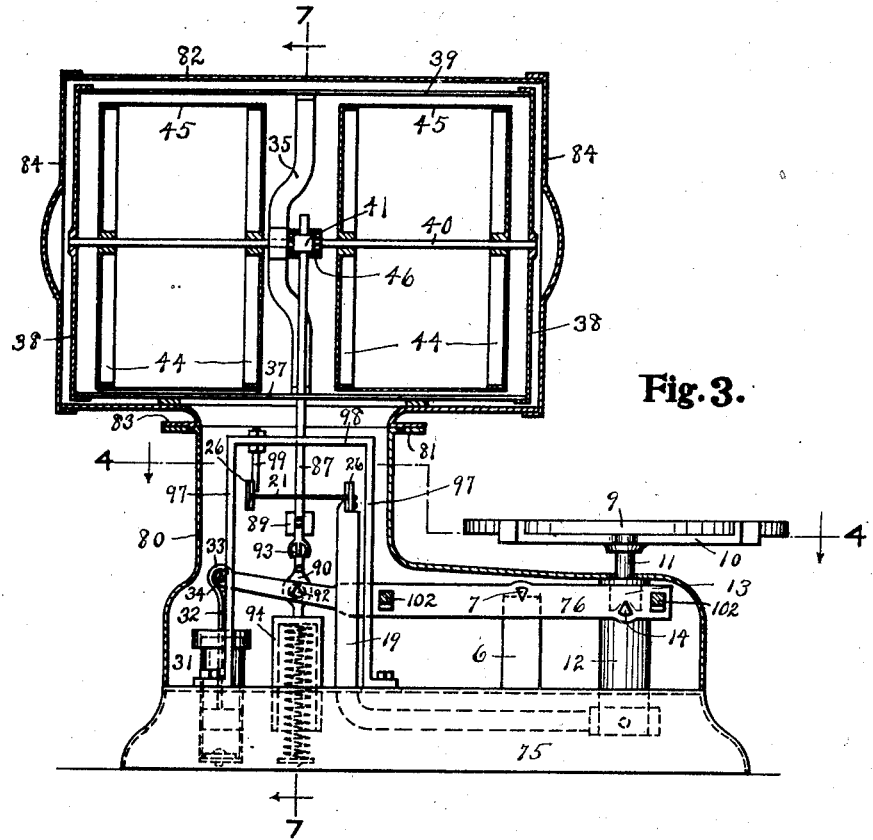
Figure 4:
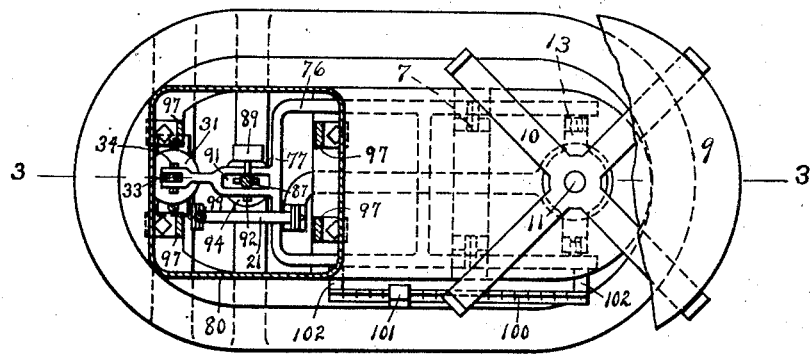
Figure 5:
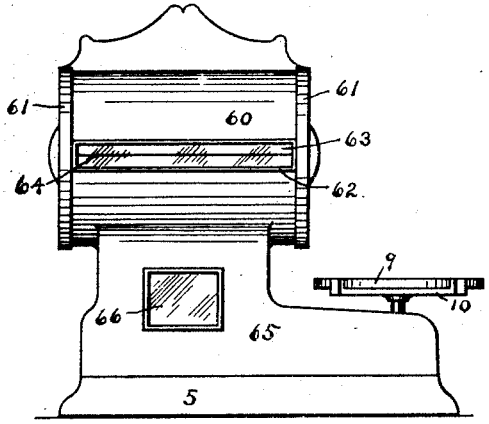
Figure 7:
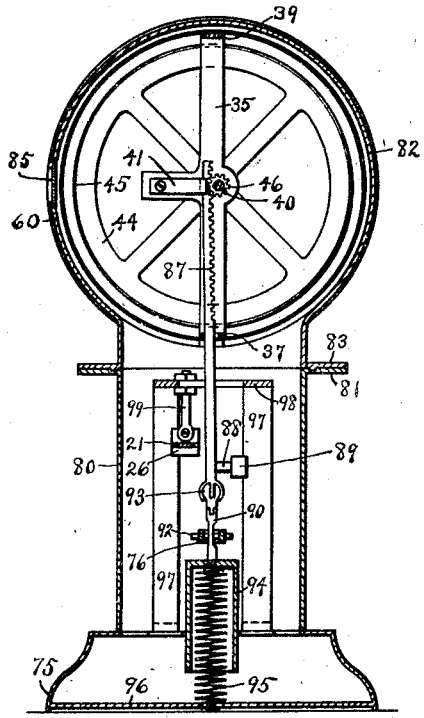
Figure 6:
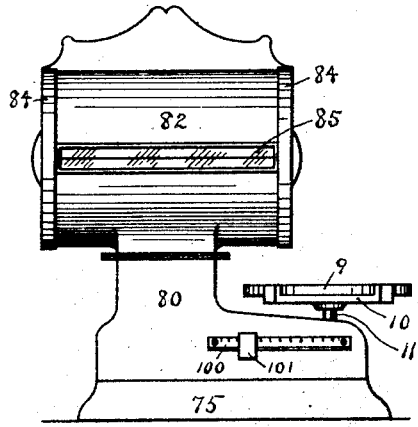
Figure 8:
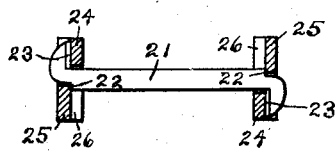

In the accompanying drawings, Figure 1 is a vertical cross section of the case and chart on the line 1—1 of Fig. 2, the other parts being in elevation. Fig. 2 is a horizontal cross section on the line 2—2 of Fig. 1, the case being omitted. Fig. 3 is a vertical cross section of the case and chart on the line 3—3 of Fig. 4 of a modified form of this type of scale the other parts being in elevation. Fig. 4 is a horizontal cross section on the line 4—4 of Fig. 3. Fig. 5 is an elevation of the scale shown in Figs. 1 and 2. Fig. 6 is an elevation of the scale shown in Figs. 3 and 4. Fig. 7 is a vertical cross section on the line 7—7 of Fig. 3. Fig. 8 is a plan of the holding link for the check rod.

Similar reference characters refer to like parts throughout the several views.

Referring to Fig. 1, 5 is a base from which the pedestals 6 project upwardly. On these pedestals rest the knife-edges 7 carried by the main lever 8. Any desirable load-receiving device may be employed, that shown being a platform or plate 9 which is carried by the four-armed spider 10. A stem 11 having an enlarged lower portion 12 extends downward from this spider and is provided with a yoke 13 which rests on the knife-edges 14 carried by the lever 8. Upwardly projecting from the base 5 is a frame, which may be formed by a plate 16 and four downwardly extending legs 17, which legs may be secured to the base by the screws 18. Extending inward in the base and upward into the frame is an L shaped check-rod 19, whose outer end connects to the bottom of the enlarged portion 12 of the stem, and whose upper end connects to the pin 20 depending from the plate 16, by means of the link 21. This link as shown on a larger scale in Fig. 8 is formed with shoulders 22 and hooks 23 to engage the parts 24 and 25 of the plates 26, connected to the bottom of the pin 20 and to the top of the check-rod 19. Faces of the parts 24 and 25 of each plate are in the same plane, while the engaging surfaces of a shoulder 22 and hook 23 are also in the same plane. Because of this construction the inner end of the rod 19 may swing freely and as the link 21 is equal in length to the distance between the knife-edges 7 and 14, the plate 9 will always remain horizontal.

A ring 28 rests on the knife-edge 27 on the beam 8, and a coil-spring 30 is tensioned between this ring and the cross bar 29. A dash-pot 31 of any desired construction may have a piston-rod 32 formed with a ring 33 which engages a pivot 34 carried at the end of the lever 8.

Supported on the plate 16 by the blocks 36 is a cross-bar 37 which carries the end bars 38, which in turn support the upper cross-bar 39 and the revoluble shaft 40. Between the bars 37 and 38 extends a bracket 35 which also furnishes a bearing for this shaft 40 and supports a guide 41 for the rack-bar 42. Mounted on the shaft 40 are wheels 44 around which are secured the cylindrical charts 45, of any desired type and graduated in any desired manner. The rack-bar 42 meshes with the gear 46 secured to the shaft 40. In order to hold the rack-bar 42 in proper engagement with the gear 46, a small arm 48 may be formed on the lower end thereof and carry the weight 49. The lever 8 may be bifurcated as shown in Fig. 2, and in the slot 51 may be mounted a link 52. The knife-edge 50 extends across this slot and through the opening in this link. To the lower end of the link is preferably secured a weight 54, while the upper end of the link connects to the lower end of the rack bar at 55.

As shown in Fig. 5, the entire mechanism with the exception of the plate 9 and spider 10, may be inclosed. The preferred case has a cylinder 60 having heads 61 and an opening 62 closed by a glass pane 63. Extending centrally across this opening, is preferably mounted a wire 64 to assist in determining the amount of rotation of the cylindrical charts 45 by reason of the load on the lever. The side 65 of the case may be provided with a window 66 through which the mechanism can be observed.

When the load is placed on the plate 9 the knife edge 14 will descend, and the opposite end of the lever 8 will rise against the tension of the spring 29. Because of the inertia of the weight 54 and the part 12, and the action of the dash-pot, the movements of the scale will be gentle and the parts will soon come to rest. The upward movement of the rack-bar 42 will turn the cylindrical charts 45 a distance proportionate to the load, the slight corrections necessitated by the changes in angularity between the rack-bar 42 and the operative line of the lever 8 being taken care of in the sealing of the scale. Because of the joint 55, the link 52 will be constantly held vertical and the movement of the parts will be without binding. Because of the horizontal length of the check rod 19, the stress on the link 21 will be slight.

Many changes in the construction of scales of this type can be made by those skilled in the art without departing from the spirit of my invention. In Figs. 3, 4, 6 and 7 a modification is shown which embodies the invention. The base 75 differs but slightly from the base 5 previously described, while the pedestals 6, the plate 9, the spider 10, the stem 11—12, the yoke 13, the check rod 19, and the link 21 are similar to the like numbered parts in Figs. 1 and 2. The scale-lever 76 is shown substantially double, the sides being united by a cross piece 77, but the knife-edges 7 and 14 will be the same as those formerly described. The dash-pot 31, the piston rod 32, the ring 33 at the upper end of the piston rod and the knife-edge 34 carried by the scale-lever may again be duplications of those formerly described.

The case 80 is preferably formed with a circular flange 81. The drum 82 is also formed with a circular flange 83 which may have a tongue-and-groove connection with the flange 81 so that this drum 82 and everything it contains may revolve on a vertical axis. The ends of the drum 82 are closed by heads 84 and the drum may be provided with a window 85 as previously described. A cross-bar 37 is suitably supported within the drum and carries the end-bars 38, which in turn carry the cross-bar 39. A bracket 35 may again extend between the cross-bars 37 and 39, and together with the end-bars 38 support the revoluble shaft 40, on which shaft are mounted the wheels 44 and the cylindrical charts 45. The bar 87 is toothed along its upper portion similar to the rack-bar 42, and like it is engaged by the guide 41 and meshes with the pinion 46 on the shaft 40. On the lower end of this rack-bar is an arm 88 which carries a small weight 89 that holds the toothed portion of the rack-bar against the pinion 46.

The link 90 extends through a slot 91 in the scale-lever and connects to the same by means of a knife-edge 92 in a manner before described. Its upper end may connect to the rack-bar 87 in any desired manner, preferably through the swivel-joint 93. The weight 54 may be replaced by the heavy shell 94, connected to the lower end of the link 90, within which shell may be mounted the spring 95 which connects to the lower end of the link 90 and to the cross-bar 96.

Extending upward from the base 75 are the legs 97 which carry the plate 98. Extending downward from this plate is a stem 99 which connects to one end of the link 21. As will be noticed, the drum 82 can be swung about the center of the flanges 81—83 so that the window 85 may be in any desired position. It is therefore necessary that the swivel-joint 93, the shell 94 and the spring 95 be in a vertical line central with the flanges 81—83.

If desired, a tare-beam 100 having a poise 101 can be mounted on the lever 76 by means of the connecting arms 102 which extend through slots in the case 80. The operation of this modified form of scale is the same as that shown in Figs. 1 and 2 and previously described.

Having now explained my construction, what I claim as my invention and desire to secure by Letters Patent is:—

1. In a scale, the combination of a base, a housing above the same, a beam fulcrumed intermediate its ends on said base, a case, an indicating chart mounted in the upper part of the housing, connections between the chart and lever whereby the chart will be moved by said lever, a load receiver pivotally supported by said beam at one side of the fulcrum, and having a stem extending down below the beam, a spring engaging the beam at the opposite side of the fulcrum to resist its movement, an L-shaped check-rod, the end of the horizontal portion of which connects to the lower end of the stem of the load-receiver and the vertical portion extending up in the case, and a link engaging the upper end of the check rod to control its movements.

2. In a scale, the combination of a base and case, a lever fulcrumed thereon intermediate its ends and having a load-platform supported by the lever at one side of the fulcrum, a spring connected to the lever at the other side of the fulcrum to resist the load, a link connected to the lever, a counter-weight connected to said link, a rack-bar extending upward from said link, a cylindrical chart, a shaft to support the same mounted in the case, a gear on said shaft in mesh with said rack-bar, and a weight on said rack bar to hold it against said gear.

In testimony whereof I have signed this specification in the presence of two subscribing witnesses.

BERT W. KING.

Witnesses:
EDWARD N. PAGELSEN,
L. JAENICHEN.